United States Patent
Othman et al.

[11] Patent Number: 5,818,208
[45] Date of Patent: Oct. 6, 1998

[54] FLICKER CONTROLLERS USING VOLTAGE SOURCE CONVERTERS

[75] Inventors: Hisham A. Othman, Cary; Rajkumar Vedam, Raleigh, both of N.C.

[73] Assignee: ABB Power T&D Company Inc., Raleigh, N.C.

[21] Appl. No.: 770,089

[22] Filed: Dec. 19, 1996

[51] Int. Cl.$^6$ .................................................. G05F 1/70
[52] U.S. Cl. ........................................ 323/207; 323/210
[58] Field of Search .................................. 323/205, 207, 323/210

[56] References Cited

U.S. PATENT DOCUMENTS

| | | | |
|---|---|---|---|
| 3,936,727 | 2/1976 | Kelley, Jr. et al. | 323/102 |
| 3,963,978 | 6/1976 | Kelley, Jr. et al. | 323/102 |
| 3,999,117 | 12/1976 | Gyugyi et al. | 323/119 |
| 4,000,455 | 12/1976 | Gyugyi et al. | 323/119 |
| 4,028,614 | 6/1977 | Kelley, Jr. | 323/102 |
| 4,068,159 | 1/1978 | Gyugyi | 323/119 |
| 4,172,234 | 10/1979 | Gyugyi et al. | 323/119 |
| 4,174,497 | 11/1979 | Depenbrock | 323/119 |
| 4,188,573 | 2/1980 | Gyugyi et al. | 323/119 |
| 4,204,151 | 5/1980 | Gyugyi et al. | 323/119 |
| 4,234,842 | 11/1980 | Brennen et al. | 323/119 |
| 4,255,700 | 3/1981 | Takeda | 323/210 |
| 4,357,570 | 11/1982 | Schmid et al. | 323/210 |
| 4,644,248 | 2/1987 | Brennen et al. | 323/205 |
| 4,691,325 | 9/1987 | Boisdon | 373/108 |
| 4,698,581 | 10/1987 | Shimamura et al. | 323/211 |
| 4,733,156 | 3/1988 | Tanaka et al. | 322/20 |
| 4,752,726 | 6/1988 | Aoyama | 323/207 |
| 4,788,653 | 11/1988 | Henderson | 364/724.01 |
| 4,851,757 | 7/1989 | Zwicky et al. | 322/58 |
| 4,967,129 | 10/1990 | Tanaka | 318/621 |
| 5,115,740 | 5/1992 | Ao et al. | 373/108 |
| 5,300,876 | 4/1994 | Takagi | 322/58 |
| 5,438,588 | 8/1995 | Wanner | 373/108 |
| 5,448,167 | 9/1995 | Takagi | 324/177 |
| 5,463,653 | 10/1995 | DuParc et al. | 373/108 |
| 5,570,007 | 10/1996 | Larsen | 323/211 |

OTHER PUBLICATIONS

Cox et al., "A New Static Var Compensator For An Arc Furnace," IEEE Transactions on Power Systems, vol. PWRS–1. No. 3, Aug. 1986.

Doulai, P. et al., "Microcontroller–based Strategy For Reactive Power Control and Distortion Compensation," IEE Proceedings, vol. 137, Pt. B, No. 6, Nov. 1990.

Takeda et al., "Arc Furnace Flicker Compensation With A Static Var Generator," Translated from Mistubishi Electric Engineering Review, vol. 65, No. 6, Dec. 1991.

Inokuchi et al., "An Application of the New Static Var Compenator Utilizing the PWM Converters," Congreso Internacional de Electrofermia, 3–7 X Dec. 1988, Malaga, Spain.

*Primary Examiner*—Jeffrey L. Sterrett
*Attorney, Agent, or Firm*—Woodcock Washburn Kurtz Mackiewicz & Norris LLP

[57] ABSTRACT

Voltage flicker is a power quality problem in power distribution circuits which is caused by the operation of fluctuating loads such as AC and DC electric arc furnaces, spot welders, starting of large ac motors, and the like. Converters based on Voltage Source technology (VSC) connected in shunt close to the fluctuating load are found to have the capability of reducing the voltage flicker level. Flicker control systems responsive to the active and reactive power components are used to exploit the capabilities of VSC in accordance with the invention. The flicker control systems reduce the voltage flicker observed at the point of common coupling by adapting, e.g., H-infinity, Linear Quadratic Gaussian, Minimum Variance Control, and self-tuning design methods for flicker control in power systems having fixed or self-tuning flicker controller parameters.

37 Claims, 8 Drawing Sheets

FLICKER CONTROLLERS USING VOLTAGE SOURCE CONVERTERS

BACKGROUND OF THE INVENTION

1. Field of the Invention

The present invention relates to techniques for controlling voltage flicker in power systems and, more particularly, to a control system for a voltage flicker controller which uses a voltage source converter to adjust the level of reactive and active power exchange with the power network in response to fluctuations in one or more loads.

2. Description of the Prior Art

Power quality problems have become increasingly expensive to industry in terms of tripped quality-sensitive loads, cost of wasted material, and cost of system re-starts. Voltage flicker is one such power quality problem which arises from the operation of fluctuating loads such as DC and AC electric arc furnaces, spot welders, and the like. Voltage flicker is perceptible to the human eye mostly in the 5 Hz to 30 Hz bandwidth and is caused by fluctuations in both the active and reactive currents drawn by the fluctuating load.

Utilities mitigate voltage flicker by connecting the fluctuating load at higher voltage buses or by running separate lines from high-voltage buses to the fluctuating load bus. However, these solutions are in general quite expensive. Static VAR Compensators (SVCs) have been the standard technique for mitigating voltage flicker in such systems. However, SVCs have limited ability to control voltage flicker primarily because of their limited switching speed. They reduce the voltage flicker by at most ½ when compared to the voltage flicker of a system without SVCs. Moreover, some SVC configurations generate low order harmonic currents and require harmonic filters.

Several voltage flicker compensators are described in the prior art. For example, in an article entitled *A New Static VAR Compensator For An Arc Furnace,* by M. D. Cox and A. Mirbod in IEEE Transactions on Power Systems, Vol. PWRS-1, No. 3, August 1986, pp. 110–119, an electronic compensator is described in which three independent single-phase pulse-width modulated inverters are used to provide the instantaneous reactive power demanded by the arc furnace. This method reduces the flicker, but has the drawback that the reduction is restricted to the flicker caused by the reactive power component only. The disclosed electronic compensator can only supply the active current demanded by the load if an energy source independent of the utility is available.

On the other hand, in an article entitled *Microprocessor-based Strategy For Reactive Power Control And Distortion Compensation,* by P. Doulai and G. Ledwich in IEE Proceedings, Vol. 137, Pt. B, No. 6, November 1990, pp. 364–372, a three-phase voltage-source converter (VSC) is described which generates an appropriate correction voltage. The real time feedback control scheme of the inverter is a full three-phase switching strategy based on a "periodic integral" version of the error sawtooth pulse-width modulation technique. The output waveform of the compensator is determined by comparison with a reference waveform and by determining the harmonic components to be canceled. However, this method has the drawback that control of the voltage normally results in interaction with system modal components in a higher bandwidth of operation. Lower controller gains are normally selected to reduce detrimental interaction, thereby reducing the effectiveness of the controller.

In article entitled *An Application Of The New Static VAR Compensator Utilizing PWM Converters,* by H. Inakuchi, F. Aoyama, T. Furuhahi, Y. Tanoue, and K. Terashima, in UIE 11, XI Congress International de Electro, 1988, Malaga, Espana, the authors propose using a "hybrid" SVC, i.e., an SVC supplemented with a VSC acting as an active filter. The authors claim that a PWM-VSC based active filter can be operated to compensate for voltage flicker in a coordinated manner. The active filter is controlled to supply the instantaneous demand for the reactive power. However, the experimental results included in the paper show lesser performance in the 10 Hz region, where the compensation is most required, when compared with the operation of the SVC alone. A conceptual drawback is that the flicker reduction is restricted to that contributed by compensation of the reactive power component alone, for no allowance is made for the flicker caused by the real power component.

Similarly, in an article entitled *Arc Furnace Flicker Compensation With A Static VAR Generator,* by M. Takeda, T. Asaeda, T. Aritsuka, S. Omari, and K. Onita, in Mitsubishi Electric Engineering Review, Vol. 65, No. 6, 1991, the authors use a PWM-VSC to control the reactive power in each phase by using current measurements. The authors show results on a 20 MVA compensator indicating flicker of lesser magnitude when compared to a system without the compensator, and claim improvement of 40%. However, in this system, the drawback is that the flicker reduction is again restricted to that caused by the reactive power component alone. No allowances are made for the real power flicker.

It has been established in the prior art that voltage source converter (VSC) technology with switching frequencies between fundamental and several kilohertz are economically feasible for mitigation of the voltage flicker problem. For example, FIG. 1 illustrates a prior art power system 10 in which a VSC 12 is capable of supplying on demand leading (or lagging) VARs, thereby making the voltage more stiff at the point of common coupling 14 in the power network 16, which, as shown, may be anywhere from the load terminals to a location within the power utility grid. The VSC 12 can be made to supply leading (or lagging) current in response to the demand imposed by the fluctuating load(s) 18, which may include one or more arc furnaces, spot welders, AC motors, and the like. However, for proper flicker mitigation, the VSC 12 requires a flicker control system 20 which adjusts the level of reactive and active power exchange with the network 16 in response to the fluctuations in the load(s) 18 as measured by three-phase voltage and current measuring device 22. As noted above, prior art flicker control systems 20 do not sufficiently adjust the level of reactive and active power exchange with the network 16, for they do not account for the flicker caused by the real power component. The present invention has been designed for this purpose.

SUMMARY OF THE INVENTION

The present invention relates to control systems for the control of voltage flicker using a voltage source converter positioned anywhere between the point of common coupling and one or more loads. The present inventors have found that appropriate modulation of the reactive demand signal of the VSC using the control systems of the invention reduces the voltage flicker observed at the point of common coupling, using any of a number of common control strategies. In accordance with the invention, the point of common coupling (PCC) can be anywhere from the load terminals to a location within the power utility grid.

The present invention generally relates to a system for providing voltage flicker reduction when one or more fluctuating loads are connected to a power line. In accordance with the invention, the voltage flicker reduction system comprises a voltage source converter responsive to a reactive current control signal so as to generate a voltage flicker compensating reactive current and to insert the voltage flicker compensating reactive current into the power line. The reactive current control signal applied to the voltage source converter is generated by flicker control means responsive to active and reactive power components of the fluctuating load, not just the reactive power components as in the prior art. The flicker control means comprises means for measuring three-phase instantaneous voltages and load currents at the voltage source converter terminal and means for calculating active and reactive currents from the measured three-phase instantaneous voltages and load currents. The calculating means may optionally contain a phase locked loop to generate lead-lag reference signals from three-phase instantaneous voltages measured by the measuring means and a three-phase to two-phase transformation which generates the active and reactive currents from the lead-lag reference signals and from three-phase load currents measured by the measuring means.

In a first embodiment of the invention, the calculating means comprises a first fixed parameter compensating block for compensating the reactive current fluctuations to minimize flicker and a second fixed parameter compensating block for compensating the active current fluctuations to minimize flicker. The first and second fixed parameter compensating blocks may comprise series lead-lag, washout, or low-pass filters which implement transfer functions such as $K_1(s) = K_1$ for the first fixed parameter compensating block, where $K_1$ is a constant, and:

$$K_2(s) = K \left( \frac{1 + sT_1}{1 + sT_2} \right) \left( \frac{1 + sT_3}{1 + sT_4} \right)$$

for the second fixed parameter compensating block, where K is a constant, and the number of lead-lag pairs $(T_n, T_{n+1})$ varies from n=1 to a desired number x (n=x). In a preferred embodiment, the first and second fixed parameter compensating blocks are designed in accordance with an H-infinity design methodology for flicker reduction. The resulting compensating active and reactive currents are then added with an offset current to yield the reactive current control signal and the sum is limited by a limiter to a range acceptable to the voltage source converter.

In a second embodiment of the invention, the measuring means further determines three-phase voltages at a point of common coupling and the calculating means further comprises means responsive to the three-phase voltages at the point of common coupling for determining a voltage magnitude at the point of common coupling. In the second embodiment, the calculating means further comprises a first fixed parameter compensating block for compensating the reactive current fluctuations to minimize flicker and a second fixed parameter compensating block responsive to a difference between the measured voltage magnitude at the point of common coupling and a reference voltage magnitude at the point of common coupling for compensating the voltage magnitude fluctuations at the point of common coupling to minimize flicker. Preferably, the first fixed parameter compensating block has a transfer function $K_{31}(s)$ and the second fixed parameter compensating block has a transfer function $K_{32}(s)$ as follows:

$$K_{31}(s) = K_1, \quad K_{32}(s) = \frac{K_2}{1 + sT}$$

where $K_1$ and $K_2$ are constants and T is time. The first and second fixed parameter compensating blocks of the second embodiment may be designed in accordance with a Linear Quadratic Gaussian or a Minimum Variance Control design methodology for flicker reduction using negative reactive current feedback in addition to feeding back the measured voltage at the point of common coupling. As in the first embodiment, a summing circuit adds the compensating reactive current and the compensating voltage magnitude at the point of common coupling to yield the reactive current control signal and a limiter for limiting the magnitude of the reactive current control signal to a range acceptable to the voltage source converter.

In a third embodiment of the invention, the calculating means comprises a first fixed parameter compensating block for compensating the reactive current fluctuations to minimize flicker and a recursive self-tuning controller responsive to a difference between the measured voltage magnitude at the point of common coupling and a reference voltage magnitude at the point of common coupling for generating a control signal for compensating the voltage magnitude at the point of common coupling to minimize flicker. The recursive self-tuning controller may implement a number of self-tuning control methodologies such as one based on a linear time series model, one in which colored noise e is assumed to be the output of a pre-whitening filter driven by white noise, or one which assumes that a voltage at the point of common coupling is affected by the self-tuning control, as well as active currents and reactive currents. A weight ρ may be placed on the self-tuning control to limit a magnitude of the control signal in accordance with a Minimum Variance Control (MVC) strategy in which a non-zero, positive value for ρ restricts the magnitude of the control signal. As in the other embodiments, a summing circuit adds the compensated reactive current signal and the control signal to yield the reactive current control signal and a limiter limits the magnitude of the reactive current control signal to a range acceptable to the voltage source converter.

The present invention also encompasses associated methods of providing voltage flicker reduction when one or more fluctuating loads are connected to a power line. A preferred embodiment of the voltage flicker reduction method of the invention comprises the steps of:

connecting a voltage source converter in the power line;

measuring active and reactive power components of the fluctuating load;

generating from the active and reactive power components of the fluctuating load a reactive current control signal for application to the voltage source converter; and the voltage source converter generating a voltage flicker compensating reactive current and inserting the voltage flicker compensating reactive current into the power line so as to minimize voltage flicker in the power line.

Generally, the measuring step comprises the step of measuring three-phase instantaneous voltages and load currents and the reactive current control signal generating step comprises the step of calculating active and reactive currents from the measured three-phase instantaneous voltages and load currents. The calculating step may selectively comprise the steps of generating lead-lag reference signals from three-phase instantaneous voltages measured in the measuring step and generating the active and reactive currents from the lead-lag reference signals and from three-phase load currents measured in the measuring step.

The methods of the invention further implement the embodiments described above in which fixed controller parameters are used to generate a control signal from the active and reactive current components at the voltage source converter terminals and in which fixed controller parameters are used to generate a control signal from the reactive current components at the voltage source converter terminals and the voltage magnitude at the point of common coupling. A compensation signal may be generated from the voltage magnitude at the point of common coupling using either fixed controller parameters or self-tuning controller parameters.

In accordance with the methods of the invention, the fixed parameter compensating blocks may be designed in accordance with an H-infinity control methodology for flicker reduction or a Linear Quadratic Gaussian or a Minimum Variance Control design methodology for flicker reduction which compensates a reactive part of the flicker using negative reactive current feedback in addition to compensating the flicker by feeding back the measured voltage at the point of common coupling. The self-tuning control parameters, on the other hand, may be generated by a recursive self-tuning controller implementing any of a number of self-tuning control methodologies such as one based on a linear time series model, one in which colored noise e is assumed to be the output of a pre-whitening filter driven by white noise, or one which assumes that a voltage at the point of common coupling is affected by the self-tuning control, as well as active currents and reactive currents. A weight ρ may be placed on the self-tuning control to limit a magnitude of the control signal in accordance with a Minimum Variance Control (MVC) strategy in which a non-zero, positive value for ρ restricts the magnitude of the control signal.

Such methods and apparatus in accordance with the invention mitigate voltage flicker caused by the operation of electric arc furnaces and the like using voltage source converters with switching frequencies ranging from fundamental up to several kilohertz.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings, of which.

DETAILED DESCRIPTION OF PRESENTLY PREFERRED EMBODIMENTS

A flicker controller with the above-mentioned beneficial features in accordance with presently preferred exemplary embodiments of the invention will be described below with reference to FIGS. 1–8. It will be appreciated by those of ordinary skill in the art that the description given herein with respect to those figures is for explanatory purposes only and is not intended in any way to limit the scope of the invention. All questions regarding the scope of the invention may be resolved by referring to the appended claims.

Figure 1:
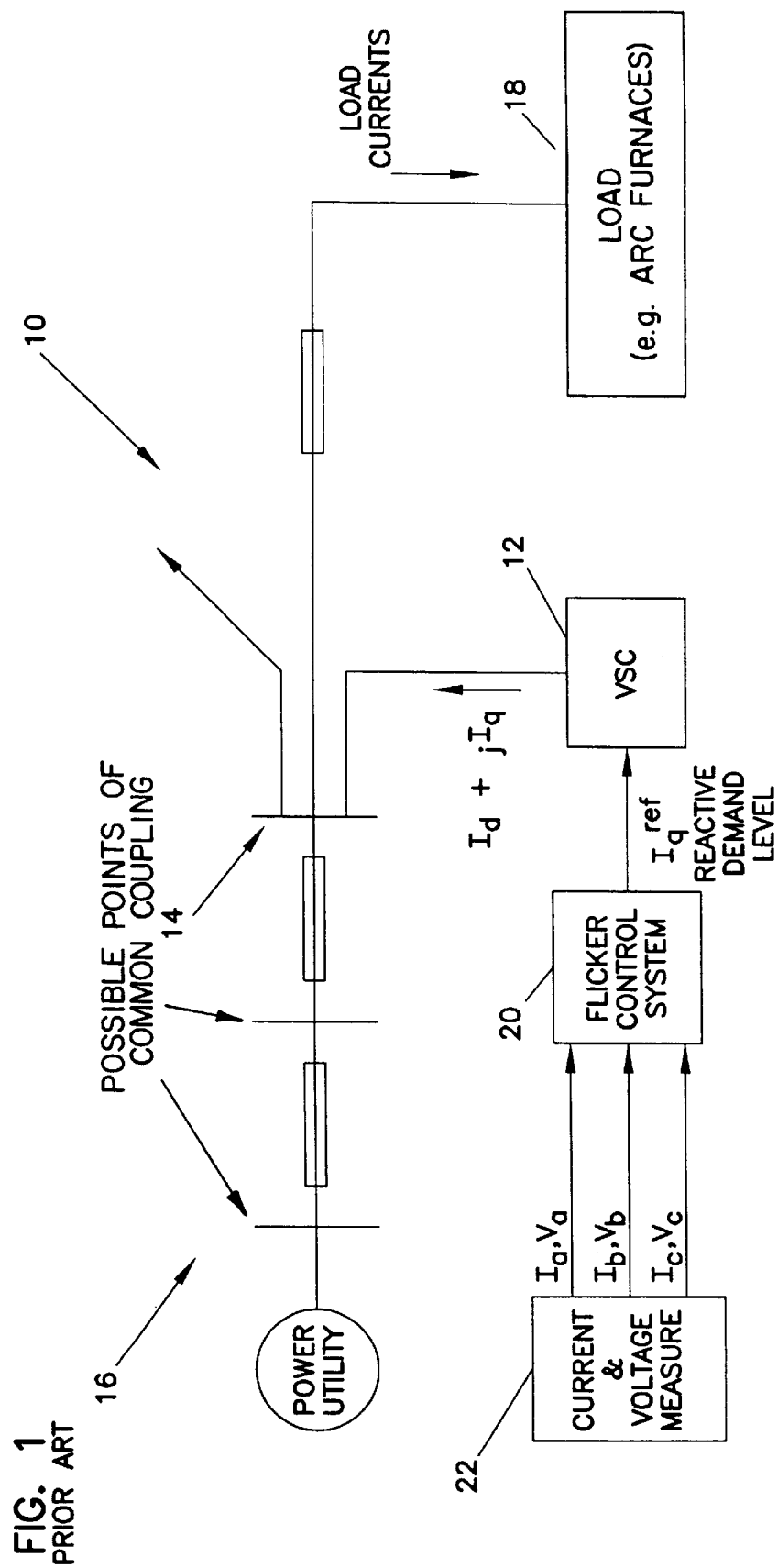
FIG. 1 illustrates a system in accordance with the invention in which a voltage source converter (VSC) is used to control voltage flicker in a power line.

Three separate embodiments of a flicker control system in accordance with the invention will be described below for use with a VSC 12 in controlling voltage flicker in a power network such as power network 16 to which one or more fluctuating loads 18 are applied as shown in FIG. 1. Like elements will be referred to by the same reference numbers throughout the drawings. The first embodiment will be described with respect to FIGS. 2–5, the second with respect to FIGS. 6 and 7, and the third with respect to FIG. 8.

1. A Fixed Parameter Current-Based Flicker Controller

Figure 2:
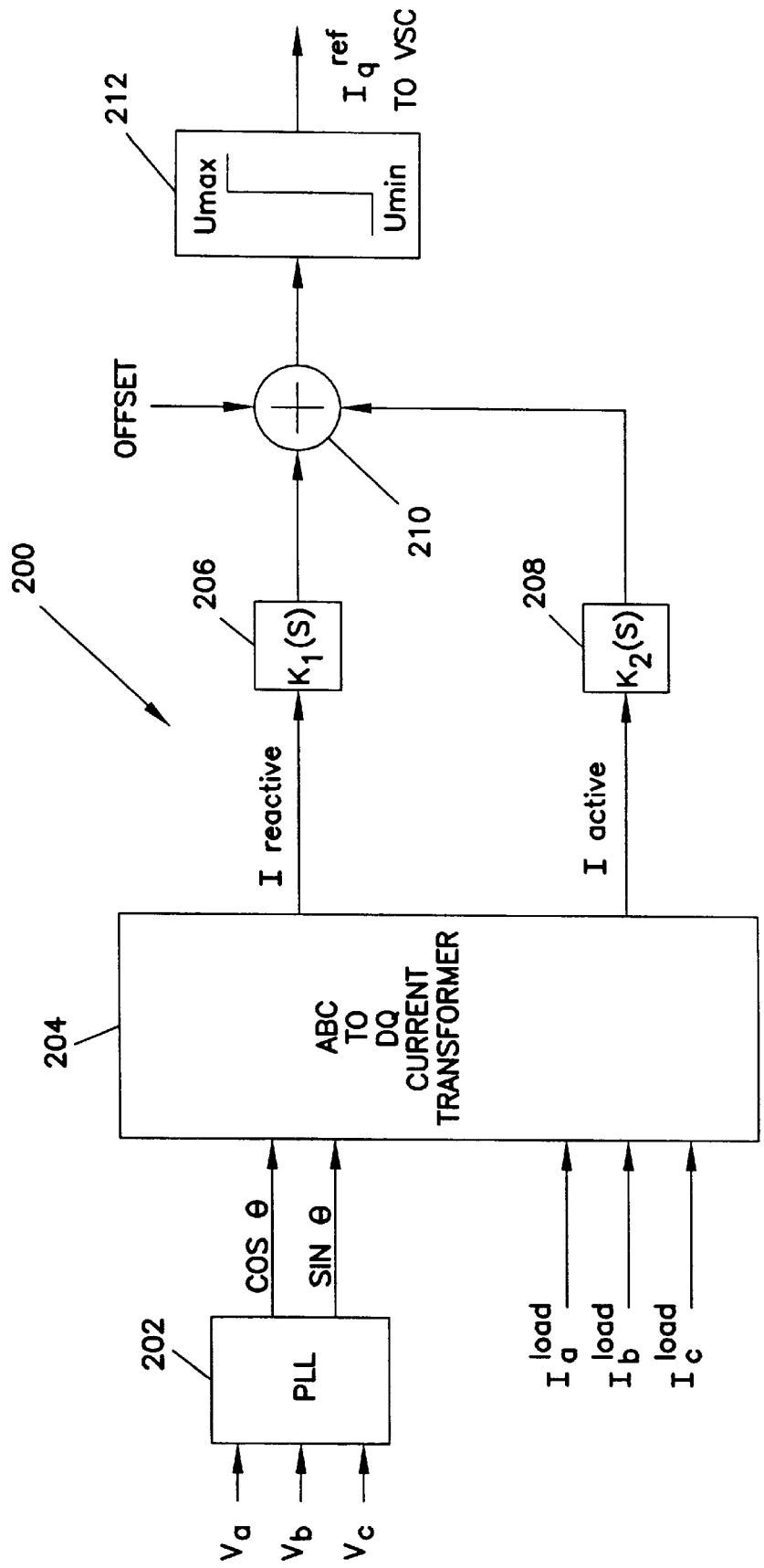
FIG. 2 illustrates a fixed parameter current-based flicker controller which utilizes both the active and reactive components of the fluctuating load to adjust the reactive current output from the VSC in accordance with the invention.
Figure 3:
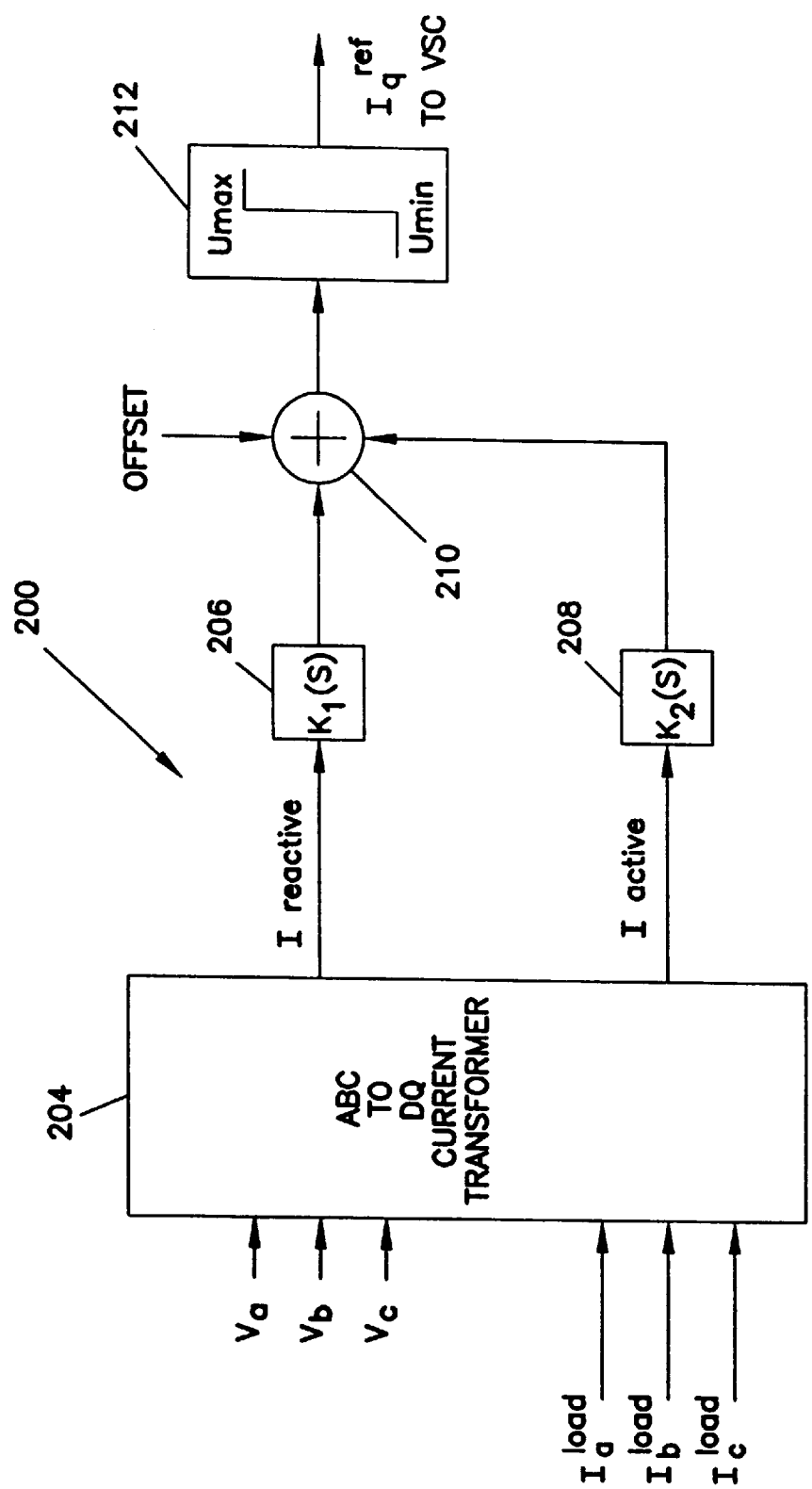
FIG. 3 illustrates an alternative embodiment of the flicker controller of FIG. 2.

A fixed parameter current-based flicker controller in accordance with a first embodiment of the invention is illustrated in FIGS. 2 and 3. The flicker controller 200 of FIGS. 2 and 3 utilizes both the active and the reactive components of the fluctuating load(s) in order to adjust the reactive current output $I_q$ from the VSC 12 (FIG. 1). A first realization of a fixed parameter current-based flicker controller 200 is shown in FIG. 2, while FIG. 3 shows an alternate realization of a flicker controller 200' without a phase locked loop. The following description is based on FIG. 2 but also applies to FIG. 3 except that the active and reactive currents are computed through static transformation in the FIG. 3 realization.

As shown in FIG. 2, measurements of instantaneous voltages $V_a$, $V_b$, and $V_c$ taken at the terminals of the VSC 12 by current and voltage measurement circuit 22 (FIG. 1) are applied to a phase-locked loop (PLL) 202. The signals cos θ and sin θ are derived from the instantaneous voltages by the PLL 202 in a conventional manner and applied to an ABC to DQ current transformation circuit 204. The measured load currents $I^{load}_a$, $I^{load}_b$, and $I^{load}_c$ are also applied to the ABC to DQ current transformation circuit 204 and converted to active and reactive components in the ABC to DQ current transformation circuit 204. The fixed parameter current-based controller 200 then takes the reactive current ($I_{reactive}$), processes it through compensator block 206 ($K_1(s)$), and yields the first component of control for compensating the flicker caused by the load reactive current fluctuations. The fixed parameter current-based controller 200 also takes the active component ($I_{active}$), processes it through compensator block 208 ($K_2(s)$), and yields the second component of control for compensating the flicker caused by the load real current fluctuations. The first and second compensation components are then added at summer 210 with an offset which ensures that the resulting control signal is at the proper level at the output of the summer 210. A limiter 212 restricts the magnitude of the control signal $I_q^{ref}$ to within the capabilities of VSC 12. The control signal $I_q^{ref}$ is then applied to the VSC 12 as the reactive current demand signal shown in FIG. 1.

Compensator blocks 206 ($K_1(s)$) and 208 ($K_2(s)$) in the embodiment of FIGS. 2 and 3 provide output control signals with traditional shapes and may comprise series lead-lag, washout, or low-pass filters. For example, compensator 206 ($K_1(s)$) may be simply realized as follows:

$$K_1(s) = K_1,$$

where $K_1$ is a constant. Compensator 208 ($K_2(s)$), on the other hand, may be realized as follows:

$$K_2(s) = K \left( \frac{1+sT_1}{1+sT_2} \right) \left( \frac{1+sT_3}{1+sT_4} \right)$$

where K is a constant, and the number of lead-lag pairs ($T_n, T_{n+1}$) could vary from 1 to as many as required. Those skilled in the art will appreciate that other structures can also be used.

Figure 4:
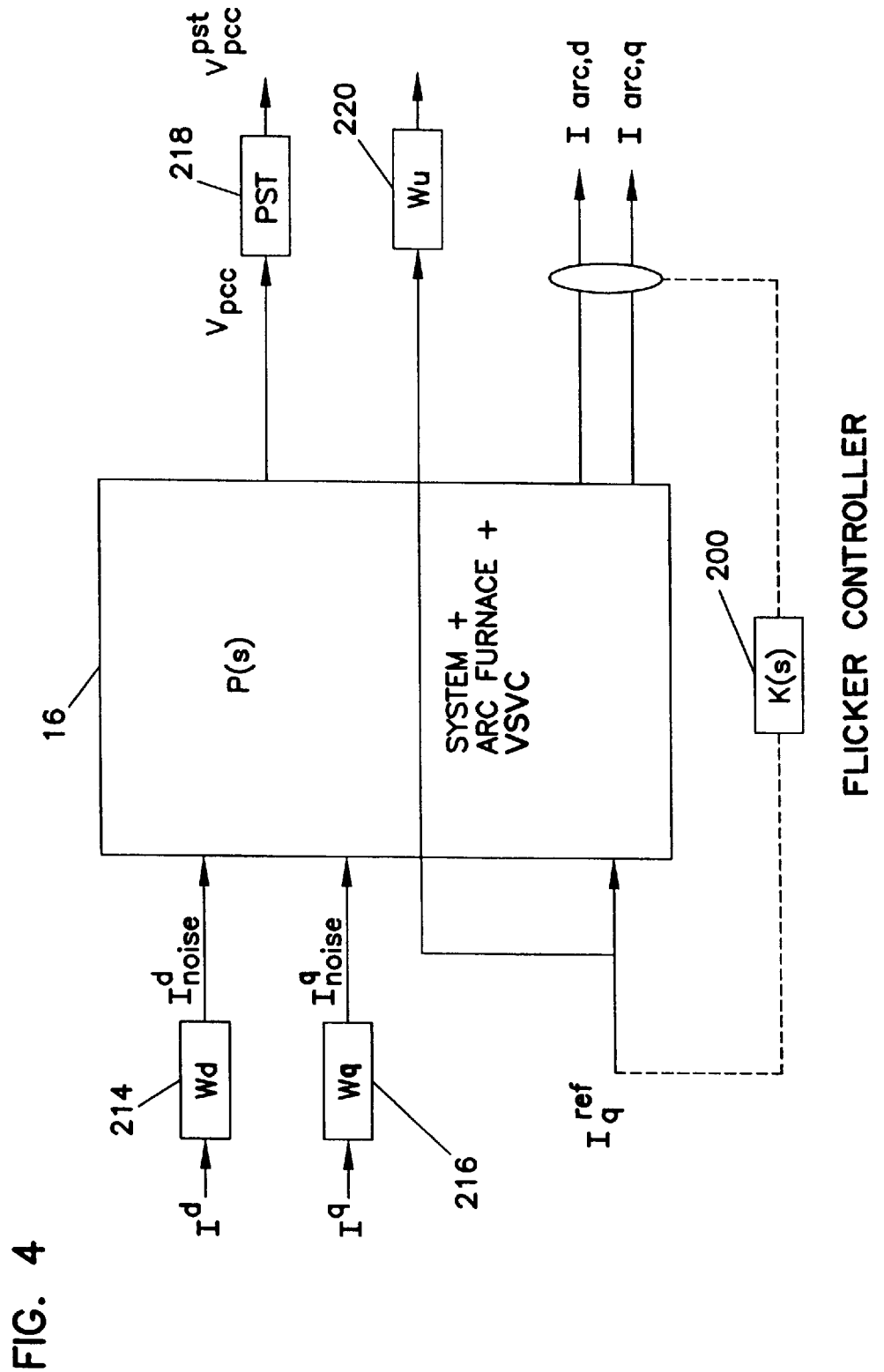
FIG. 4 illustrates the H-infinity design methodology for design of the compensator blocks in the flicker controllers of FIGS. 2 and 3.

The design of the compensator blocks 206 ($K_1(s)$) and 208 ($K_2(S)$) can be accomplished by any means known to those skilled in the control design art. One method which may be used in a preferred embodiment of the invention is the H-infinity design methodology with a structure of the type shown in FIG. 4. As shown in FIG. 4, the flicker control design setup is adapted to fit the H-infinity design method requirements.

The H-infinity control design method illustrated in FIG. 4 is used to shape the transfer function between the random load current fluctuations and the voltage magnitude at the point of common coupling (PCC), such as point 14 in FIG. 1. FIG. 4 illustrates a schematic of the control setup. In the schematic of FIG. 4, Wd 214 and Wq 216 are filters selected to represent the noise characteristics in the power network 16 (i.e., it is assumed that the load currents are noise sources in the power network 16). The design of these filters is facilitated from studying the FFT characteristics of the load currents (noises). As noted above, the feedback flicker controller 200 uses measurements of the load real currents ($I_d^{arc}$) and reactive currents ($I_q^{arc}$) to generate $I_q^{ref}$. The voltage at PCC 14 ($V_{PCC}$) is then shaped through a flicker meter (PST) 218 and is selected as a performance signal ($V_{PCC}^{pst}$). The target level for the worst-case influence of either the real or reactive current on the flicker meter 218 output is set at 1. Filter Wu 220 is a filter selected by the user to shape the control effort. Then, by observing the Bode plot of the designed full-order controller, a low order approximation can be obtained. A major advantage of this method is that, unlike prior art techniques, it compensates flicker caused by the active and reactive components of load current.

Figure 5:
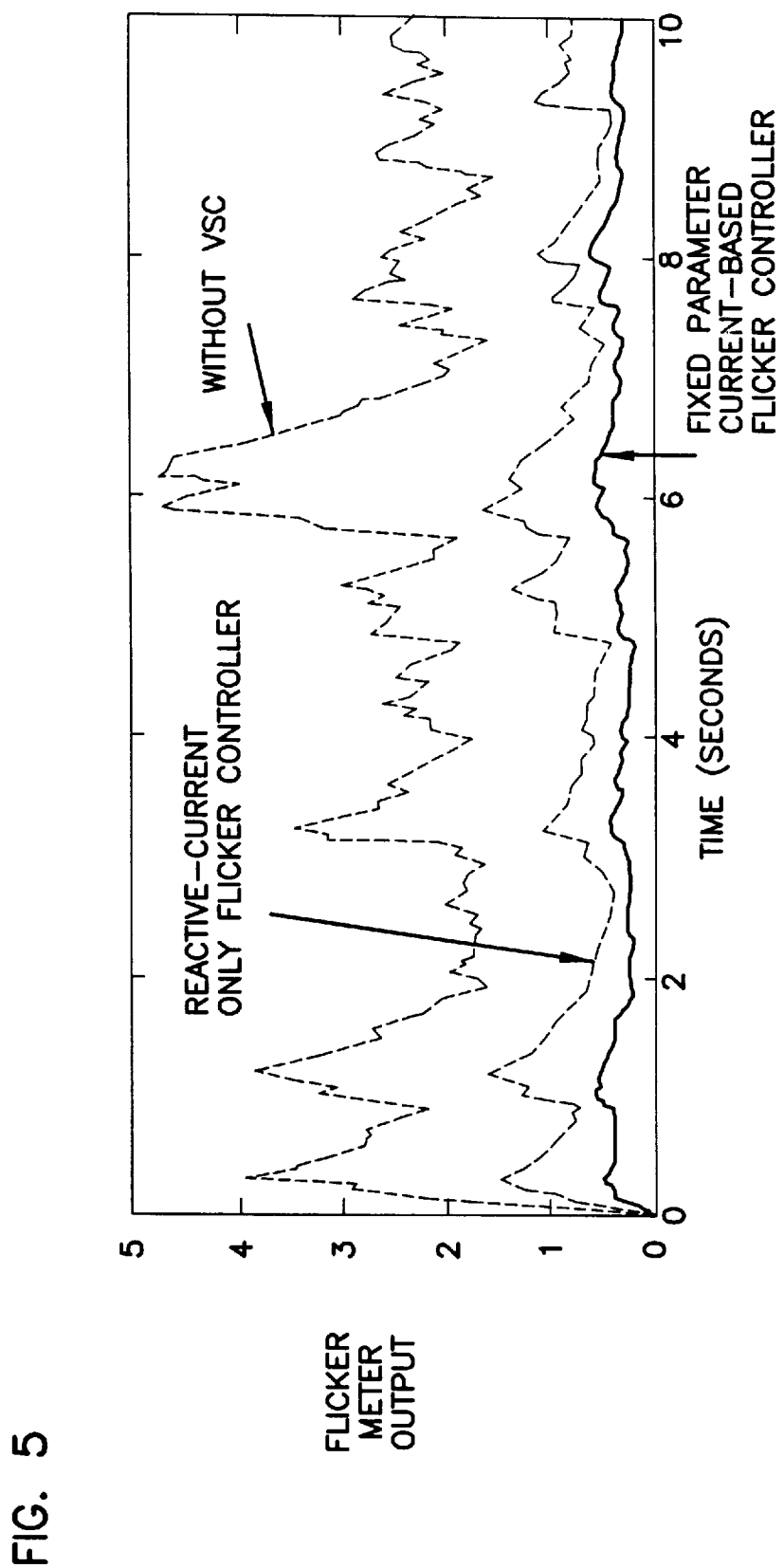
FIG. 5 illustrates a comparison of the flicker of systems which do not use a VSC in the flicker controller, which use a reactive-current only flicker controller, and which use a fixed parameter current-based flicker controller in accordance with the invention.

FIG. 5 shows a sample comparison result of the fixed parameter current-based flicker controller 200 of FIGS. 2 and 3 with a flicker controller without a VSC and with a VSC with a reactive-current only flicker controller. In each case, detailed simulations of AC and DC electrical circuits and components in an Electromagnetic Transients Simulations Program (EMTDC) are used. It is clear from the results shown in FIG. 5 that the fixed parameter current-based flicker controller of FIGS. 2 and 3 greatly reduces the flicker when compared against the case of using only the reactive component of load current (i.e., using negative reactive current feedback alone) and the case when no VSC flicker controller is utilized.

2. A Fixed Parameter Current And Voltage Based Flicker Controller

Figure 6:
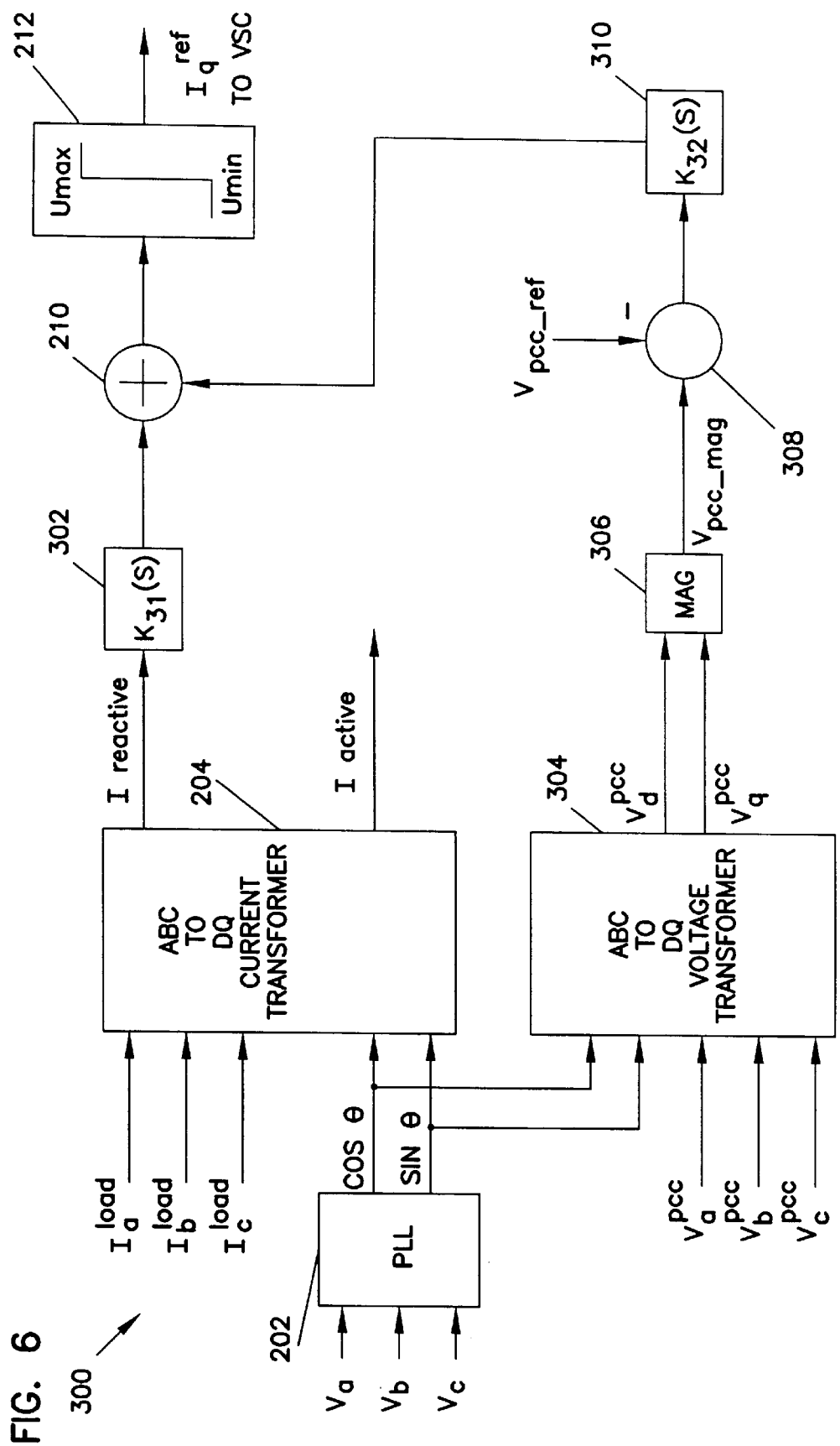
FIG. 6 illustrates a fixed parameter current and voltage based flicker controller in accordance with a second embodiment of the invention.
Figure 7:
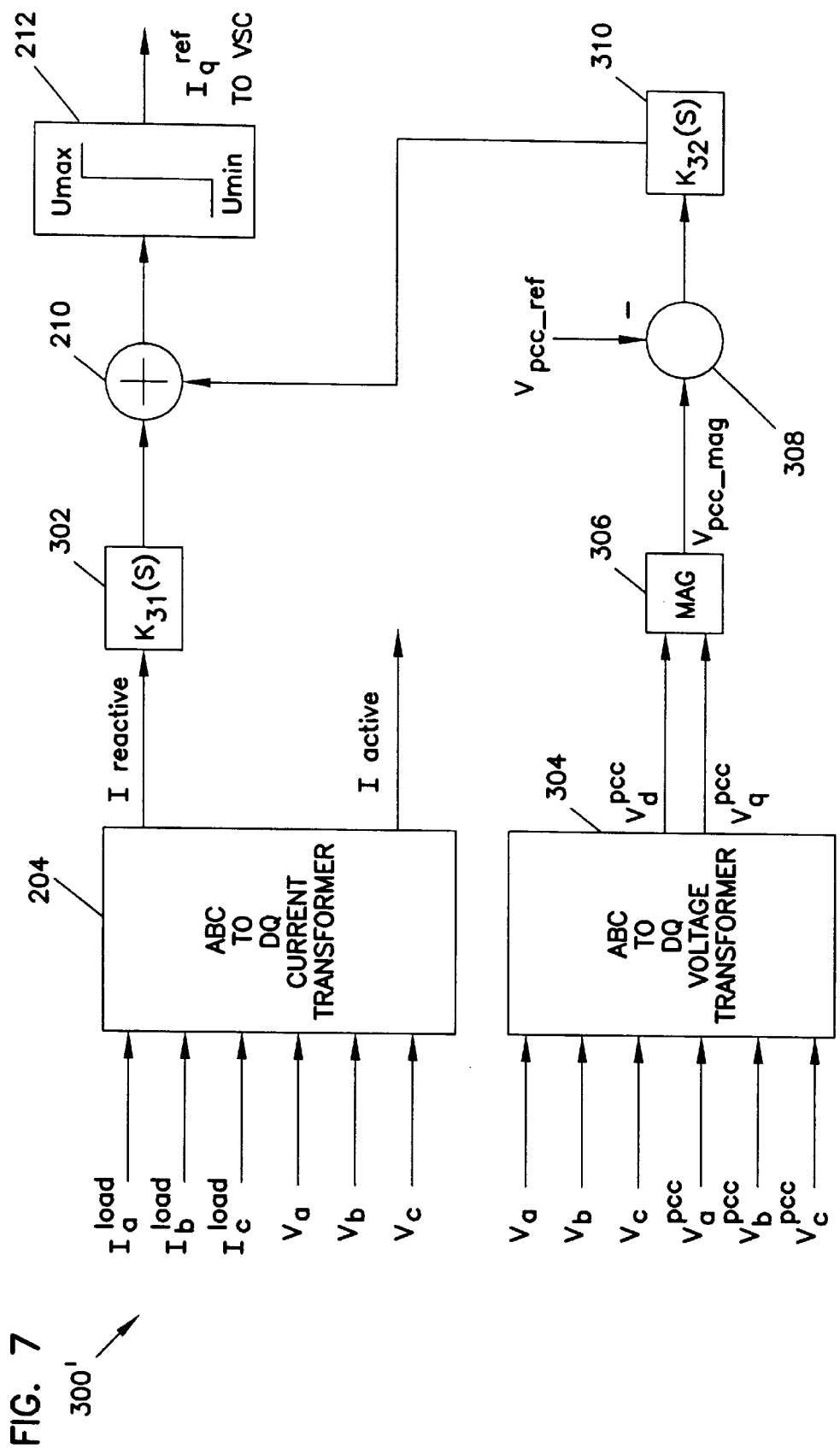
FIG. 7 illustrates an alternative embodiment of the flicker controller of FIG. 6.

A fixed parameter current and voltage based flicker controller in accordance with a second embodiment of the invention is illustrated in FIGS. 6 and 7. As will be described below, the flicker controller 300 of FIGS. 6 and 7 utilizes the reactive component of the fluctuating load(s) and the magnitude of the voltage at the point of common coupling in order to adjust the reactive current output $I_q$ from the VSC 12 (FIG. 1). As noted above, the point of common coupling can be anywhere from the load terminals to a location within the power utility grid. A first realization of a fixed parameter current and voltage based flicker controller 300 is shown in FIG. 6, while FIG. 7 shows an alternate realization without a phase locked loop. The following description is based on FIG. 6 but also applies to FIG. 7 except that the active and reactive currents are computed through static transformation in the FIG. 7 realization.

As shown in FIG. 6, measurements of instantaneous voltages $V_a$, $V_b$, and $V_c$ taken at the terminals of the VSC 12 by current and voltage measurement circuit 22 (FIG. 1) are applied to a phase-locked loop (PLL) 202. The signals cos θ and sin θ are derived from the instantaneous voltages by the PLL 202 in a conventional manner and applied to an ABC to DQ current transformation circuit 204. The measured load currents $I^{load}_a$, $I^{load}_b$, and $I^{load}_c$ are also applied to the ABC to DQ current transformation circuit 204 and converted to active and reactive components in the ABC to DQ transformation circuit 204. The fixed parameter current and voltage based flicker controller 300 then takes the reactive current component ($I_{reactive}$), processes it through the compensator block 302 ($K_{31}(s)$), and forms the first component of control for compensating the flicker caused by the load reactive current fluctuations. Unlike the first embodiment, the active current component ($I_{active}$) is not processed. Instead, the instantaneous voltages at PCC 14 ($V^{pcc}_a$, $V^{pcc}_b$, and $V^{pcc}_c$) and the signals cos θ and sin θ are processed by an ABC to DQ voltage transformation circuit 304 to yield the signals $V^{pcc}_d$ and $V^{pcc}_q$. The magnitudes of the signals $V^{pcc}_d$ and $V^{pcc}_q$ are then computed in magnitude measuring circuit 306. A reference signal ($V_{pcc\_ref}$) is subtracted from the resulting magnitude signal ($V_{pcc\_mag}$) by subtractor 308, and the difference (error) is processed in the fixed parameter current and voltage based flicker compensator 310 ($K_{32}(s)$) to form the second component of control for compensating the flicker in an overall-sense. The control components are summed at summer 210 and the limiter 212 restricts the magnitude of the control signal $I_q^{ref}$ to within the capabilities of VSC 12. The control signal $I_q^{ref}$ is then applied to the VSC 12 as the reactive current demand signal shown in FIG. 1.

An alternative realization of the flicker controller 300' without the PLL is shown in FIG. 7. Generally, the difference between the FIG. 6 and FIG. 7 realizations is in the manner in which the load current and the voltage at PCC are computed. In particular, in FIG. 6, a PLL 202 is used, while in FIG. 7, a static transformation yields the control signals. The structures shown in FIGS. 6 and 7 to compute the voltage at PCC and the load current components are similar to the fixed and self-tuning controllers based on current and voltage described with respect to the other embodiments and thus will not be further described here. It will be understood by those skilled in the art that in each of these methods, these alternative realizations can be used.

Compensator blocks 302 ($K_{31}(s)$) and 310 ($K_{32}(s)$) in the embodiment of FIGS. 6 and 7 provide output control signals with traditional shapes and may be made of series lead-lag, washout, and low-pass filters. For example, compensator 302 ($K_{31}(s)$) and the compensator 310 ($K_{32}(s)$) may be simply realized as follows:

$$K_{31}(s) = K_1, \quad K_{32}(s) = \frac{K_2}{1+sT}$$

where $K_1$ and $K_2$ are constants. However, as will be described below, other simplifications are also possible.

As noted above, there are several methods for obtaining the compensation blocks using the current and voltage signals to reduce the flicker. Two such methods now will be described.

In accordance with the first method, the fixed parameter current and voltage based flicker controller design is set in the Linear Quadratic Gaussian (LQG) framework. The model used for the design is represented as follows:

$$\frac{dX}{dt} = AX + bI_q^{req} + Gw, \quad w = \begin{bmatrix} I_d^{load} \\ I_q^{load} \end{bmatrix}$$

$$y = CX + DU + v$$

The control input is assumed to have two channels. One instance of the first channel is to set controller $K_{31}(s)$ to −1. The first part of the control is then absorbed in the above equation, within the matrix A. Of course, other possibilities also exist for the design of $K_{31}(s)$, as will be apparent to those skilled in the art.

In accordance with LQG theory, it is necessary that the state noise, w, and sensor noise, v, be of zero mean and finite covariance. In order to put the system of the second embodiment into the LQG framework, the state noise w is defined as the output of a linear system fed with white noise. By studying the FFT of the load currents, the main flicker frequencies may be noted. The filter (linear system) is then designed so that when fed with broad-band noise (white noise), the output of the linear system has frequency components of the desired magnitude, similar to the load current characteristics. The linear system is represented as follows:

$$\frac{dn}{dt} = Pn + Rm, \quad E\{m\} = 0, E\{mm^T\} = \alpha I$$

$$w = Sn$$

The overall system is lumped to form a stabilizable meta-state space model as follows:

$$\begin{bmatrix} \frac{dX}{dt} \\ \frac{dn}{dt} \end{bmatrix} = \begin{bmatrix} A & GS \\ O & P \end{bmatrix} \begin{bmatrix} X \\ n \end{bmatrix} + \begin{bmatrix} b \\ O \end{bmatrix} I_q^{ref} + \begin{bmatrix} O \\ R \end{bmatrix} m$$

The state feedback gains are computed by selecting the state weighting matrix to weight the deviations in the voltage magnitude at the point of common coupling. The voltage magnitude signal is also selected as the output for the LQG observer. Thus, the flicker controller 300 can be put in the form of a compensator. By observing the Bode plot of the controller, simplified LQG controllers can be designed by restricting the frequency of interest in the flicker range.

In accordance with the second method, the fixed parameter current and voltage based flicker controller design is posed in a Minimum Variance Control (MVC) formulation. As known to those skilled in the art, the MVC strategy is natural in the context of controlling voltage output at PCC 14, since the MVC control strategy attempts to minimize the deviations in the voltage from the reference, when driven by the arc-furnace noise. In discrete-time, the MVC strategy yields the control input to minimize the expected deviation of the output from its reference, one prediction ahead of time. The prediction is made by using a suitable model of the process, the current, and old measurements. The minimum variance controller, in general, cancels all the poles and zeroes of the process, thus making the output follow the reference output (in this context, the reference output is considered to be the inverse plant). This method is not generally preferred for processes that are non-minimum phase because of robustness problems that arise from imperfect cancellations. However, a solution to this problem is to factorize the flicker controller 300 so that only the minimum-phase zeroes are canceled.

The stable portion of the inverse plant may be approximated as follows. First, a model of the fluctuating load(s) 18 is identified off-line, between the voltage at PCC 14 and the input to the VSC 12. MVC controller is basically the inverse plant of this identified system. As noted above, selection of the inverse plant must be made very carefully, to avoid robustness problems. The method proposed for such selection is to examine the Bode plot of the identified plant, especially in the flicker frequency range. The inverse plant is then approximated in this region. The inverse plant structure is first postulated by observing the magnitude characteristic of the Bode plot of the identified plant. For example, if the identified plant shows a magnitude response resembling a high-pass filter in the flicker frequency range, then the inverse plant structure is selected as a low-pass filter. The parameters of the inverse plant can then be obtained by, for example, minimizing the error in the frequency response of the product of the plant and inverse-plant cascade, subtracted from 1, in the frequency range of interest.

The advantage of the fixed parameter current and voltage based flicker controller 300 of the second embodiment is that it compensates the reactive part of the flicker through the negative reactive current feedback, in addition to compensating flicker in an overall sense by feeding back the voltage at the point of common coupling.

3. Self-Tuning Parameters Flicker Controllers Which Are Current Based And Current And Voltage Based When there is uncertainty about the model parameters, or when the parameters vary with time or changing system characteristics, there is merit in seeking self-tuning control options, for these controllers continually optimize the performance of the flicker controller on the basis of measured signals. Accordingly, a self-tuning parameter flicker controller 400 in accordance with a third embodiment of the invention now will be described with respect to FIG. 8.

Figure 8:
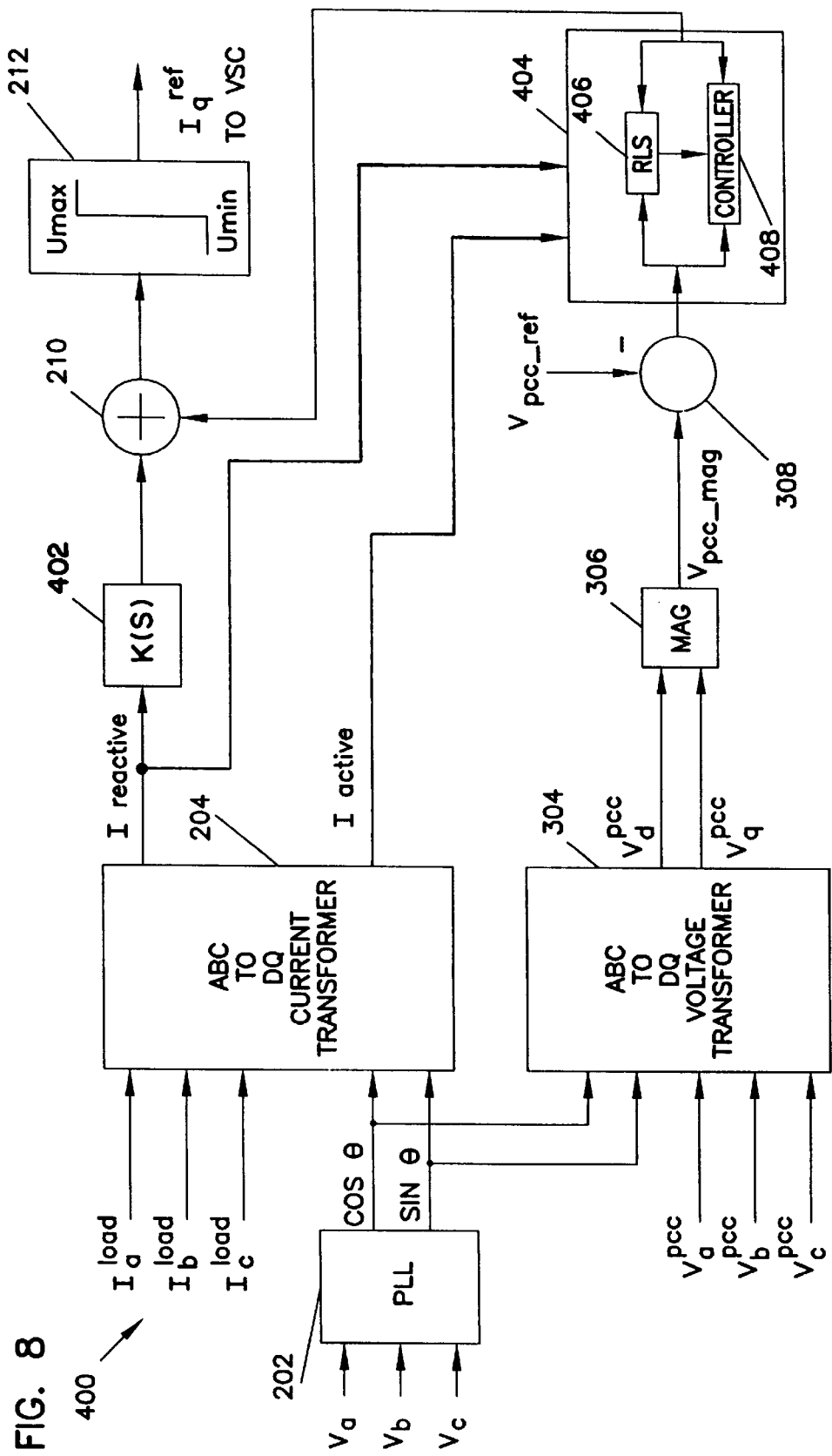
FIG. 8 illustrates a self-tuning flicker controller in accordance with a third embodiment of the invention.

As shown in FIG. 8, measurements of instantaneous voltages $V_a$, $V_b$, and $V_c$ taken at the terminals of the VSC 12 by the current and voltage measurement circuit 22 (FIG. 1) are applied to a phase-locked loop (PLL) 202. The reference signals cos θ and sin θ are derived from the instantaneous voltages by the PLL 202 in a conventional manner and applied to the ABC to DQ current transformation circuit 204 along with the measured load currents $I^{load}_a$, $I^{load}_b$ and $I^{load}_c$ to yield the active and reactive load currents $I_{reactive}$ and $I_{active}$. As in the first and second embodiments, the PLL 202 is not strictly required; the active and reactive currents may be computed through static transformation. As in the second embodiment, the ABC to DQ voltage transformation circuit 304 receives the reference signals cos θ and sin θ from the PLL 202 along with the voltage at PCC 14 signals $V^{pcc}_a$, $V^{pcc}_b$, and $V^{pcc}_c$ and processes these values to yield the voltage components, $V^{pcc}_d$ and $V^{pcc}_q$. The magnitudes of the voltage components $V^{pcc}_d$ and $V^{pcc}_q$ are then determined by the magnitude determining circuit 306 as in the second embodiment to yield $V_{pcc\_mag}$.

The reactive load current ($I_{reactive}$) is fed through compensator block 402 (K(s)) to the summing circuit 210 to yield the component of control that compensates for the flicker caused by the reactive power fluctuations. The voltage magnitude signal ($V_{pcc\_mag}$), on the other hand, has the voltage reference $V_{pcc\_ref}$ subtracted from it at subtractor circuit 308, and the error adjusted signal is applied to a recursive self-tuning controller 404 which estimates the parameters of the chosen model structure between the output and the input based on the supplied active and reactive currents ($I_{active}$ and $I_{reactive}$) and the voltage magnitude at PCC 14 ($V_{pcc\_mag}$). Depending on the model structure selected, the load current components also may be used in the model. For example, as described in more detail below, RLS portion 406 and control portion 408 of the self-tuning controller 404 provide the parameters for adjustment. The output of the self-tuning controller 404 forms the second part of the control signal which is applied to summing circuit 210 to compensate for flicker in an overall sense. When added to the other component of control by summing circuit 210 and magnitude limited by amplitude limiter 212, the reactive power demand control signal $I_q^{ref}$ is formed.

This embodiment is distinguished from the other embodiments in that the flicker compensation method follows from the posing of the problem in the framework of the self-tuning control methodology. Accordingly, a linear time series model of the process may be selected as follows:

$$y_k = \sum_{i=1}^{n} a_i y_{k-i} + \sum_{i=1}^{n} b_i u_{k-i} + e_{k-1} \quad \text{Equation (1)}$$

where y is the output (deviation from the steady-state voltage magnitude at PCC 14, or a function of the load current components), u is the control input, e is the process noise with zero-mean characteristics, and n is the order of the model. There are two channels in the control: the first channel feeds the reactive current through a fixed controller K(s), one instance of which is K(s)=−1, and the other channel provides the self-tuning control using self-tuning controller 404.

When the noise e is colored, it is preferable to assume an extended model structure, one in which the colored noise is assumed to be the output of a pre-whitening filter driven by white noise, v, i.e., $$y_k = \sum_{i=1}^{n} a_i y_{k-i} + \sum_{i=1}^{n} b_i u_{k-i} + \sum_{i=1}^{n} c_i v_{k-i} \quad \text{Equation (2)}$$

Those skilled in the art will appreciate that self-tuning control provides great flexibility in selecting the model structure. For example, another model structure investigated by the present inventors is the following, based on the reasoning that the voltage at the PCC 14 is affected by the control, as well as the active and reactive load currents:

$$y_k = \sum_{i=1}^{n} a_i y_{k-i} + \sum_{i=1}^{n} b_i u_{k-i} + \sum_{i=1}^{n} c_i I_{d,k-i}^{load} + \sum_{i=1}^{n} d_i I_{q,k-i}^{load} + e_{k-1} \quad \text{Equation (3)}$$

The control is designed by minimizing the following criterion function, which implements a Minimum Variance Control (MVC) strategy:

$$J(u_k-1) = 0.5 \, (y_k - y_k^{ref})^2 + 0.5 \rho u_{k-1}^2 \quad \text{Equation (4)}$$

where ρ is a weight on the control. The non-zero, positive control weight assures that the process poles and zeros will not be canceled and, in addition, will restrict the magnitude of the control signal.

Now, if $\psi = [y_{k-1}, y_{k-2}, \ldots, y_{k-n}, u_{k-1}, u_{k-2}, \ldots, u_{k-n}]$ is the measurement vector (defined here for the model of Equation (1); done similarly for other models, including the models of Equations (2) and (3)) and $\theta = [a_1, a_2, \ldots, a_n, b_1, b_2, \ldots, b_n]^T$ is the parameter vector (defined here for the model of Equation (1); done similarly for other models, including the models of Equations (2) and (3)), then the parameters of the model are estimated using the Recursive Least Squares (RLS) method in the RLS portion 406 of recursive self-tuning controller 404 as follows:

$$\theta_k = \theta_{k-1} + L_k \lfloor y_k - \phi_{k-1}\theta_{k-1} \rfloor$$

$$L_k = \frac{P_{k-1}\phi_k}{\lambda + \phi_k^T P_{k-1}\phi_k}$$

$$P_k = P_{k-1} - \frac{P_{k-1}\phi_k\phi_k^T P_{k-1}}{\lambda + \phi_k^T P_{k-1}\phi_k}$$

where X is a "Forgetting Factor," which is an artifice used to discount the effect of old measurements and to emphasize more recent measurements. This "forgetting factor" is normally selected to be between 1 and a very small positive number greater than zero. When selected as 1, there is no effect of "forgetting."

A number of user choices exist for the initialization of the algorithm implemented by the self-tuning controller. Any or all of the following options may be chosen by the user:

1. The choice of model structure must be made to fit the problem at hand in the most appropriate manner (e.g., use the model of Equation (1), (2), or (3)).

2. The initial parameters must be chosen such that good local convergence is assured. In general, for the first start-up of the algorithm, all parameters are set to zero, except for the leading coefficient of the control (i.e., $b_1$ set to 1). Subsequent runs of the algorithm use the old estimates.

3. The initial covariance matrix must be chosen to reflect the noise statistics in the process. In general, it may be noted that the larger the initialization, the more rapidly the parameter estimates vary (in a transient sense). The speed of adaptation may be controlled by choosing the initial gain and subsequent re-initializations appropriately. In general, it is desired to separate the identification and control transients by controlling the speed of adaptation for more robust performance of the algorithm.

4. The covariance matrix is updated using the square root algorithm to get superior numerical properties and to maintain positive definiteness of P at all times. A positive definite P is required for assuring convergence of the algorithm.

5. Regularization of the algorithm is necessary to ensure vitality to track parameter changes, should the need arise. In doing so, the trace of P is monitored at all times. If it falls below a preset bound, P is reinitialized to a preset constant as suggested in choice 3, and similarly re-initialized if the trace exceeds a preset upper limit.

6. The Forgetting Factor must be chosen appropriately to enable tracking of slowly varying parameters (e.g., set X=1 for no forgetting; set X as a so-called exponential forgetting factor; or set X to do directional-forgetting based on the process characteristics).

7. The constrained parameter region must be chosen to ensure that during periods of poor identifiability, the parameter estimates do not drift to unrealistic regions. For example, the parameter b, is constrained to keep its sign from changing (since changing sign would imply that the sign of the feedback changes).

8. The choice of deadzone is necessary to freeze the adaptation when the working signals are not persistently exciting. This improves the robustness of the overall algorithm.

9. The scaling factor must be chosen to ensure that the signals are all normalized in a numerically sound region.

10. The compensation factor must be chosen to ensure that the input values designed have suitable gain.

The advantages of using such self-tuning predictive control are: (1) flicker contributed by reactive power is compensated using the reactive load current feedback; (2) minimum variance feedback of the voltage at PCC (or some function of the load current components) reduces flicker in an overall sense; and (3) the self-tuning option continually optimizes performance, even when the loading patterns change substantially.

Three embodiments of a flicker control system and method for mitigation of voltage flicker, caused especially by (but not restricted to) the operation of electric arc furnaces, have been described in detail above. Each of the flicker control systems and methods described utilize voltage source converter technology with switching frequencies ranging from fundamental up to several kHz. Numerous control design methodologies have also been implemented in accordance with the invention. In particular, the first embodiment, a fixed parameter current based flicker controller, has been designed using H-infinity control design methods; the second embodiment, a fixed parameter current and voltage based flicker controller, has been designed using Linear Quadratic Gaussian (LQG) control and Minimum Variance Control (MVC) design methods; and the third embodiment, a self-tuning parameter current based and current and voltage based flicker controller, has been designed using self-tuning control design methods. Although numerous control design methods have been described with respect to the disclosed embodiments, those skilled in the art will appreciate that other design methods known in the art may also be used.

Although several exemplary embodiments of the invention have been described in detail above, those skilled in the art will appreciate that many additional modifications are possible in the exemplary embodiments without materially departing from the novel teachings and advantages of the invention. Accordingly, all such modifications are intended to be included within the scope of this invention as defined in the following claims.

What we claim is:

1. A system for providing voltage flicker reduction when a fluctuating load is connected to a power line, said voltage flicker reduction system comprising:

a voltage source converter responsive to a reactive current control signal so as to generate a voltage flicker compensating reactive current and to insert said voltage flicker compensating reactive current into said power line; and flicker control means responsive to active and reactive power components of said fluctuating load for generating said reactive current control signal for application to said voltage source converter.

2. A system as in claim 1, wherein said flicker control means comprises means for measuring three-phase instantaneous voltages and load currents and means for calculating active and reactive currents from said measured three-phase instantaneous voltages and load currents.

3. A system as in claim 2, wherein said calculating means comprises a phase locked loop which generates lead-lag reference signals from three-phase instantaneous voltages measured by said measuring means and a three-phase to two-phase transformation means which generates said active and reactive currents from said lead-lag reference signals and from three-phase load currents measured by said measuring means.

4. A system as in claim 2, wherein said calculating means further comprises a first fixed parameter compensating block for compensating reactive current fluctuations to minimize flicker and a second fixed parameter compensating block for compensating active current fluctuations to minimize flicker.

5. A system as in claim 4, wherein said first and second fixed parameter compensating blocks comprise at least one of series lead-lag, washout, and low-pass filters.

6. A system as in claim 4, wherein said first fixed parameter compensating block has a transfer function $K_1(s) = K_1$, where $K_1$ is a constant, and said second fixed parameter compensating block has a transfer function $K_2(s)$ as follows:

$$K_2(s) = K \left( \frac{1+sT_1}{1+sT_2} \right) \left( \frac{1+sT_3}{1+sT_4} \right)$$

where K is a constant, and a number of lead-lag pairs $(T_n, T_{n+1})$ varies from n=1 to a desired number x (n=x).

7. A system as in claim 4, wherein said first and second fixed parameter compensating blocks are designed in accordance with an H-infinity design methodology for flicker reduction.

8. A system as in claim 4, further comprising a summing circuit for adding said compensating active and reactive currents with an offset current to yield said reactive current control signal and a limiter for limiting a magnitude of said reactive current control signal to a range acceptable to said voltage source converter.

9. A system as in claim 2, wherein said measuring means further determines three-phase voltages at a point of common coupling, and said calculating means further comprises means responsive to said three-phase voltages at said point of common coupling for determining a voltage magnitude at said point of common coupling.

10. A system as in claim 9, wherein said calculating means further comprises a first fixed parameter compensating block for compensating reactive current fluctuations to minimize flicker and a second fixed parameter compensating block responsive to a difference between said measured voltage magnitude at said point of common coupling and a reference voltage magnitude at said point of common coupling for compensating voltage magnitude fluctuations at said point of common coupling to minimize flicker.

11. A system as in claim 10, wherein said first fixed parameter compensating block has a transfer function $K_{31}(s)$ and said second fixed parameter compensating block has a transfer function $K_{32}(s)$ as follows:

$$K_{31}(s) = K_1, \quad K_{32}(s) = \frac{K_2}{1+sT}$$

where $K_1$ and $K_2$ are constants and T is time.

12. A system as in claim 10, wherein said first and second fixed parameter compensating blocks are designed in accordance with a Linear Quadratic Gaussian design methodology for flicker reduction using negative reactive current feedback in addition to feeding back the measured voltage at said point of common coupling.

13. A system as in claim 10, wherein said first and second fixed parameter compensating blocks are designed in accordance with a Minimum Variance Control design methodology for flicker reduction using negative reactive current feedback in addition to feeding back the measured voltage at said point of common coupling.

14. A system as in claim 10, further comprising a summing circuit for adding said compensating reactive current and said compensated voltage magnitude at said point of common coupling to yield said reactive current control signal and a limiter for limiting a magnitude of said reactive current control signal to a range acceptable to said voltage source converter.

15. A system as in claim 9, wherein said calculating means further comprises a first fixed parameter compensating block for compensating reactive current fluctuations to minimize flicker and a recursive self-tuning controller responsive to a difference between said measured voltage magnitude at said point of common coupling and a reference voltage magnitude at said point of common coupling for generating a control signal for compensating voltage magnitude fluctuations at said point of common coupling to minimize flicker.

16. A system as in claim 15, wherein said recursive self-tuning controller implements a self-tuning control methodology based on a linear time series model as follows:

$$y_k = \sum_{i=1}^{n} a_i y_{k-i} + \sum_{i=1}^{n} b_i u_{k-i} + e_{k-1}$$

where y is an output deviation from a steady-state voltage magnitude at the point of common coupling or a function of components of said load current, u is a control input, e is a process noise with zero-mean characteristics, n is the order of linear time series model, and a and b are constants.

17. A system as in claim 15, wherein said recursive self-tuning controller implements a self-tuning control methodology in which colored noise e is assumed to be the output of a pre-whitening filter driven by white noise v as follows:

$$y_k = \sum_{i=1}^{n} a_i y_{k-i} + \sum_{i=1}^{n} b_i u_{k-i} + \sum_{i=1}^{n} c_i v_{k-i}$$

where y is an output deviation from a steady-state voltage magnitude at the point of common coupling or a function of components of said load current, u is a control input, n is the order of linear time series model, and a, b, and c are constants.

18. A system as in claim 15, wherein said recursive self-tuning controller implements a self-tuning control methodology which assumes that a voltage at the point of common coupling is affected by the self-tuning control, as well as active currents $I_d^{load}$ and reactive currents $I_q^{load}$ as follows:

$$y_k = \sum_{i=1}^{n} a_i y_{k-i} + \sum_{i=1}^{n} b_i u_{k-i} + \sum_{i=1}^{n} c_i I_{d,k-i}^{load} + \sum_{i=1}^{n} d_i I_{q,k-i}^{load} + e_{k-1}$$

where y is an output deviation from a steady-state voltage magnitude at the point of common coupling or a function of components of said load current, u is a control input, e is a process noise with zero-mean characteristics, n is the order of linear time series model, and a, b, c, and d are constants.

19. A system as in claim 18, wherein a weight ρ is placed on said self-tuning control to limit a magnitude of said control signal, said control signal being generated by said self-tuning controller by minimizing the following criterion function J, which implements a Minimum Variance Control (MVC) strategy:

$$J(u_{k-1}) = 0.5 \ (y_k - y_k^{ref})^2 + 0.5 \rho u_{k-1}^2$$

whereby a non-zero positive value for ρ will restrict the magnitude of the control signal.

20. A system as in claim 15, further comprising a summing circuit for adding said compensated reactive current and said control signal to yield said reactive current control signal and a limiter for limiting a magnitude of said reactive current control signal to a range acceptable to said voltage source converter.

21. A method of providing voltage flicker reduction when a fluctuating load is connected to a power line, said voltage flicker reduction method comprising the steps of:
connecting a voltage source converter in said power line;
measuring active and reactive power components of said fluctuating load;
generating from said active and reactive power components of said fluctuating load a reactive current control signal for application to said voltage source converter; and
said voltage source converter generating a voltage flicker compensating reactive current and inserting said voltage flicker compensating reactive current into said power line so as to minimize voltage flicker in said power line.

22. A method as in claim 21, wherein said measuring step comprises the step of measuring three-phase instantaneous voltages and load currents and said reactive current control signal generating step comprises the step of calculating active and reactive currents from said measured three-phase instantaneous voltages and load currents.

23. A method as in claim 22, wherein said calculating step comprises the steps of generating lead-lag reference signals from three-phase instantaneous voltages measured in said measuring step and generating said active and reactive currents from said lead-lag reference signals and from three-phase load currents measured in said measuring step.

24. A method as in claim 22, wherein said calculating step comprises the steps of applying said reactive currents to a first fixed parameter compensating block for compensating reactive current fluctuations to minimize flicker and applying said active currents to a second fixed parameter compensating block for compensating active current fluctuations to minimize flicker.

25. A method as in claim 24, comprising the further step of designing said first and second fixed parameter compensating blocks in accordance with an H-infinity design methodology for flicker reduction.

26. A method as in claim 24, comprising the further steps of adding said compensated active and reactive currents with an offset current to yield said reactive current control signal and limiting a magnitude of said reactive current control signal to a range acceptable to said voltage source converter.

27. A method as in claim 22, wherein said measuring step comprises the further step of measuring three-phase voltages at a point of common coupling, and said calculating step further comprises the step of determining a voltage magnitude at said point of common coupling.

28. A method as in claim 27, wherein said calculating step comprises the steps of applying said reactive currents to a first fixed parameter compensating block for compensating reactive current fluctuations to minimize flicker, determining a difference between said measured voltage magnitude at said point of common coupling and a reference voltage magnitude at said point of common coupling, and applying said difference to a second fixed parameter compensating block for compensating voltage magnitude fluctuations at said point of common coupling to minimize flicker.

29. A method as in claim 28, comprising the further step of designing said first and second fixed parameter compensating blocks in accordance with a Linear Quadratic Gaussian design methodology for flicker reduction which compensates a reactive part of said flicker using negative reactive current feedback in addition to compensating said flicker by feeding back the measured voltage at said point of common coupling.

30. A method as in claim 28, comprising the further step of designing said first and second fixed parameter compensating blocks in accordance with a Minimum Variance Control design methodology for flicker reduction which compensates a reactive part of said flicker using negative reactive current feedback in addition to compensating said flicker by feeding back the measured voltage at said point of common coupling.

31. A method as in claim 28, comprising the further steps of adding said compensating reactive current and said compensating voltage magnitude at said point of common coupling to yield said reactive current control signal and limiting a magnitude of said reactive current control signal to a range acceptable to said voltage source converter.

32. A method as in claim 27, wherein said calculating step comprises the further step of applying said reactive currents to a first fixed parameter compensating block for compensating reactive current fluctuations to minimize flicker, determining a difference between said measured voltage magnitude at said point of common coupling and a reference voltage magnitude at said point of common coupling, and applying said difference to a recursive self-tuning controller for generating a control signal for compensating voltage magnitude fluctuations at said point of common coupling to minimize flicker.

33. A method as in claim 32, comprising the further step of implementing a self-tuning control methodology in said self-tuning controller based on a linear time series model as follows:

$$y_k = \sum_{i=1}^{n} a_i y_{k-i} + \sum_{i=1}^{n} b_i u_{k-i} + e_{k-1}$$

where y is an output deviation from a steady-state voltage magnitude at the point of common coupling or a function of components of said load current, u is a control input, e is a process noise with zero-mean characteristics, n is the order of linear time series model, and a and b are constants.

34. A method as in claim 32, comprising the further step of implementing a self-tuning control methodology in said self-tuning controller whereby colored noise e is assumed to be the output of a pre-whitening filter driven by white noise v as follows:

$$y_k = \sum_{i=1}^{n} a_i y_{k-i} + \sum_{i=1}^{n} b_i u_{k-i} + \sum_{i=1}^{n} c_i v_{k-i}$$

where y is an output deviation from a steady-state voltage magnitude at the point of common coupling or a function of components of said load current, u is a control input, n is the order of linear time series model, and a, b, and c are constants.

35. A method as in claim 32, comprising the further step of implementing a self-tuning control methodology in said self-tuning controller whereby a voltage at the point of common coupling is affected by the self-tuning control, as well as active currents $I_d^{load}$ and reactive currents $I_q^{load}$ as follows:

$$y_k = \sum_{i=1}^{n} a_i y_{k-i} + \sum_{i=1}^{n} b_i u_{k-i} + \sum_{i=1}^{n} c_i I_{d,k-i}^{load} + \sum_{i=1}^{n} d_i I_{q,k-i}^{load} + e_{k-1}$$

where y is an output deviation from a steady-state voltage magnitude at the point of common coupling or a function of components of said load current, u is a control input, e is a process noise with zero-mean characteristics, n is the order of linear time series model, and a, b, c, and d are constants.

36. A method as in claim 35, comprising the further steps of placing a weight ρ is placed on said self-tuning control to limit a magnitude of said control signal, and generating said control signal by minimizing the following criterion function J, which implements a Minimum Variance Control (MVC) strategy:

$$J(u_{k-1}) = 0.5 \, (y_k - y_k^{ref})^2 + 0.5 \rho u_{k-1}^2$$

whereby a non-zero positive value for ρ will restrict the magnitude of the control signal.

37. A method as in claim 32, comprising the further steps of adding said compensated reactive current and said control signal to yield said reactive current control signal and limiting a magnitude of said reactive current control signal to a range acceptable to said voltage source converter.

* * * * *

UNITED STATES PATENT AND TRADEMARK OFFICE
CERTIFICATE OF CORRECTION

PATENT NO. : 5,818,208

DATED : October 6, 1998

INVENTOR(S) : Hisham A. Othman et al.

It is certified that error appears in the above-indentified patent and that said Letters Patent is hereby corrected as shown below:

Col. 12, line 3, "$\psi$" should be -- $\varphi$ --

Col. 12, line 21, "X" should be --$\lambda$--

Col. 12, paragraph #6, at lines 58, 59 and 60 "X" should be --$\lambda$--

Col. 15, claim 19, line 65 of column, the equation should read:

$$J(u_{k-1}) = 0.5(y_k - y_k^{ref})^2 + 0.5\rho u_{k-1}^2$$

Signed and Sealed this

Twenty-third Day of February, 1999

Attest:

*Attesting Officer*

Q. TODD DICKINSON

*Acting Commissioner of Patents and Trademarks*